United States Patent [19]

Mylari

[11] 3,896,124

[45] July 22, 1975

[54] PREPARATION OF 2 (ARYL)-AS-TRIAZINE-3,5(2H,4H)-DIONES

[75] Inventor: Banavara L. Mylari, Waterford, Conn.

[73] Assignee: Pfizer Inc., New York, N.Y.

[22] Filed: Nov. 20, 1973

[21] Appl. No.: 417,675

Related U.S. Application Data

[63] Continuation-in-part of Ser. No. 160,530, July 7, 1971, abandoned.

[52] U.S. Cl.... 260/248 AS; 260/239.7; 260/247.1 M; 260/243 B; 424/249; 424/246; 424/248
[51] Int. Cl..................................... C07d 55/10
[58] Field of Search ...... 260/248 AS, 239.6, 247.1, 260/243 B, 239.7, 247.1 M

[56] References Cited
UNITED STATES PATENTS 3,852,289   12/1974   Mylari et al. ...................... 260/248

*Primary Examiner*—John M. Ford
*Attorney, Agent, or Firm*—Connolly and Hutz

[57] ABSTRACT

A process for the preparation of 2(aryl)-as-triazine-3,5(2H,4H)-diones by the decarboxylation of the corresponding 6-carboxylic acid comprising contacting said acid with at least a 0.1 molar proportion of mercaptocarboxylic acid. Mercaptocarboxylic esters also bring about the decarboxylation, possibly by the in situ formation of the corresponding mercaptocarboxylic acid.

8 Claims, No Drawings

PREPARATION OF 2 (ARYL)-AS-TRIAZINE-3,5(2H,4H)-DIONES

CROSS REFERENCE TO RELATED APPLICATIONS

This application is a continuation-in-part of my copending application Ser. No. 160,530, filed July 7, 1971, now abandoned.

BACKGROUND OF THE INVENTION

This application relates to the field of chemical control of coccidiosis, a severe, wasting disease of young poultry caused by a protozoan infection. In particular, it relates to a novel process for the production of certain 2-substituted aryltriazine diones which have been found to be potent compounds in controlling coccidiosis.

A limited number of 2-substituted aryltriazine diones have been prepared by the thermal decarboxylation of the corresponding 6-carboxylic acids. The thermal decarboxylation is generally effected by heating the triazine carboxylic acid precursors (prepared by the method of Slouka, Monatsh. Chem. 96:134–137, 1965) to temperatures above their melting points. The melting points of these acids are generally in the range of 250°–300°C., but some melt above 300°C. As a result of these high melting points, the pyrolysis reaction affords poor yields and is usually characterized by the production of dark, tarry by-products of unknown composition.

Thermal decarboxylation is also unsuitable for products which are thermally labile as are many of the desired compounds of this invention.

SUMMARY OF THE INVENTION

For the above reasons it was considered highly desirable to develop a means of decarboxylating the 6-carboxylic acid precursors to produce the 2-(aryl)-as-triazine-3,5(2H,4H)-diones at substantially lower temperatures.

The present invention comprises a process for the preparation of 2-(aryl)-as-triazine-3,5(2H,4H)diones which comprises contacting compound A of the formula:

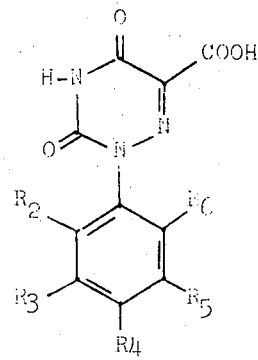

wherein
each of $R_2$ and $R_6$ is hydrogen, fluoro, chloro, cyano or methyl, with the proviso that at least one of $R_2$ and $R_6$ is hydrogen or fluoro;
each of $R_3$ and $R_5$ is selected from a first sub-group consisting of hydrogen, cyano, trifluoromethyl, halogen and lower alkyl; a second sub-group consisting of lower alkoxy and lower alkylthio; or a third sub-group consisting of nitro and thiocyanato;
$R_4$ is $-NR_7R_8$, lower alkanoyl, lower alkyl sulfonyl, $SO_2NRR_1$;

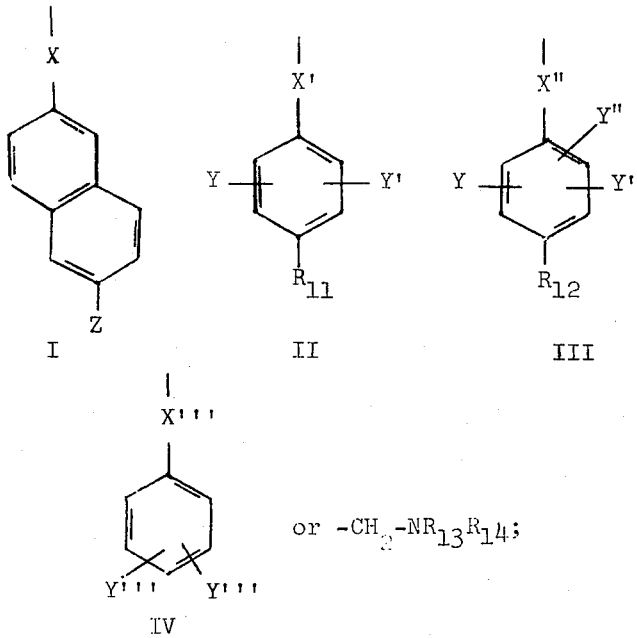

with the proviso that when $R_4$ is $SO_2NRR_1$ or lower alkanoyl, at least one of $R_3$ and $R_5$ is other than hydrogen;
R is selected from the group consisting of methyl, ethyl, phenyl, benzyl, allyl, propargyl and p-chlorophenyl;
$R_1$ is selected from the group consisting of methyl, ethyl, allyl and propargyl;
R and $R_1$ when taken together with the nitrogen to which they are attached are selected from the group consisting of pyrrolo, pyrrolino, pyrrolidino, piperidino, N-(lower alkyl)piperazino, hexamethyleneimino, 3,4-dichloropiperidino, thiazolidino, and Δ³-tetrahydropyridino and piperazino;

each of $R_7$ and $R_8$ is selected from the group consisting of lower alkyl of from 1 to 4 carbon atoms; $R_7$ and $R_8$ when taken together with the nitrogen atom to which they are attached are selected from the group consisting of pyrrolo, pyrrolino, pyrrolidino, piperidino, N-(lower alkyl)piperazino, hexamethyleneimino, thiazolidino, Δ³-tetrahydropyridino and piperazino;

$X'''$ is selected from the group consisting of oxygen, sulfur, $>C = O$, $=NH$, $—S→O$, $—SO_2—$, and $—CHOH—$;

$Y'''$ is hydrogen, nitro, cyano, halogen, lower alkyl, or lower alkoxy;

provided that where $R_3$ or $R_5$ is methyl or chloro and $X'''$ is sulfur, $—SO_2—$, or $>C = O$, then $R_4$ is other than

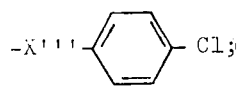

$R_{11}$ is hydrogen, halogen, lower alkylthio, lower alkylsulfinyl, lower alkylsulfonyl, lower alkoxy, trifluoromethyl, or nitro;

$R_{12}$ is lower alkylthio, lower alkylsulfinyl, lower alkylsulfonyl, trifluoromethyl, lower alkanoyl or $SO_2NR_{15}R_{16}$ wherein $R_{13}$ and $R_{14}$ taken together with the nitrogen to which they are attached complete a morpholino, thiomorpholino, or thiazolidino ring;

$R_{15}$ is hydrogen, lower alkyl, propargyl, allyl, hydroxyethyl, acetoxyethyl, β-methylthioethyl, β-methoxyethyl, or 3-(2-methoxyethoxy)propyl;

$R_{16}$ is hydrogen, lower alkyl, propargyl, allyl, hydroxyethyl, or acetoxyethyl;

$R_{15}$ and $R_{16}$ when taken together with the nitrogen to which they are attached are pyrrolino, pyrrolidino, morpholino, thiomorpholino, N-(lower alkyl)piperazino, thiazolidino, Δ³-tetrahydropyridino or piperazino.

Z is hydrogen, lower alkylthio, or halogen;

Y, Y' and Y" are each hydrogen, halogen, lower alkyl, or trifluoromethyl;

X is oxygen, sulfur, or $—OCH_2—$;

X' is $—OCH_2—$, $—SCH_2—$; $—SOCH_2—$, $—SO_2CH_2—$, or $—CH_2—$, $—OCH_2—CO—$,

X" is oxygen, sulfur, SO, $SO_2$, $>C=O$, or $—CHOH—$;

with at least about 0.1 molar proportion of compound B which is mercapto-substituted-alkanoic acid of up to about eleven carbon atoms; thiosalicylic acid; or the lower alkyl esters thereof, until the reaction is substantially complete.

The process is preferred wherein the ratio of said compound B to said compound A is from about 0.1:1.0 to 10:1. The process is also preferred wherein said compound B is mercaptoacetic acid. The process is further preferred wherein said contacting is conducted at from 130° to 170°C.

The process is preferred wherein said compound A is so selected from $R_4$ is of the formula:

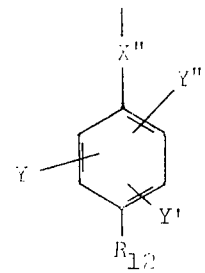

and especially preferred wherein X" is oxygen, $R_{12}$ is $—COCH_3$; $R_3$ is chloro; $R_5$ is methyl; $R_2$, $R_6$, Y, Y', and Y" are each hydrogen.

DETAILED DESCRIPTION OF THE INVENTION

The 2-phenyl-as-triazine-3,5-(2H,4H)diones useful as coccidiostats are prepared by decarboxylation of the corresponding 6-carboxy derivatives by reaction with a mercaptocarboxylic acid. The requisite 6-carboxy acid derivatives are obtained by acid hydrolysis of the corresponding cyano compounds which are, in turn, prepared according to the procedure of Slouka, Monatsh. Chem. 94, 258–262 (1963). This method comprises reaction of the appropriate phenyl diazonium salt with cyanoacetylurethan to provide the corresponding phenylhydrazono-cyanoacetylurethan which, under the influence of alkali or sodium acetate-acetic acid or ammonium acetate-acetic acid produces the 6-cyano compound which is hydrolyzed to the carboxy acid under acid or alkaline conditions. Carboxy acids useful in this reaction are very numerous. One class of such compounds, preferred because it affords coccidiostats of substantial value, is disclosed in copending application, Serial No. 78,917 filed Oct. 7, 1970 and assigned to the same assignee as the present case. That class includes compounds of the formula:

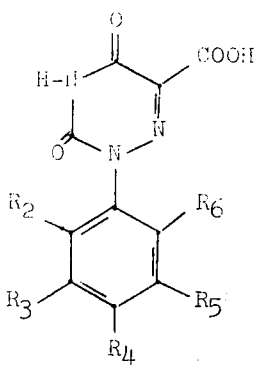

wherein each of $R_2$ and $R_6$ is hydrogen, fluoro, chloro, cyano or methyl, with the proviso that at least one of $R_2$ and $R_6$ is hydrogen or fluoro;

each of $R_3$ and $R_5$ is selected from a first sub-group consisting of hydrogen, cyano, trifluoromethyl, halogen and lower alkyl; a second sub-group consisting of lower alkoxy and lower alkylthio; or a third sub-group consisting of nitro and thiocyanato;

$R_4$ is —$NR_7R_8$, lower alkanoyl, lower alkyl sulfonyl, $SO_2NRR_1$;

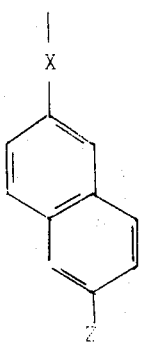
I

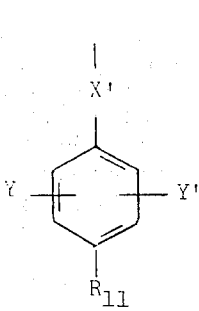
II

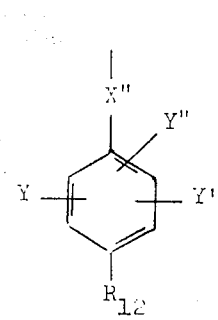
III

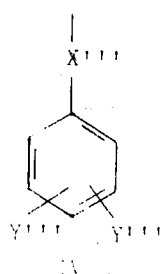

or —$CH_2$—$NR_{13}R_{14}$;

with the proviso that when $R_4$ is $SO_2NRR_1$ or lower alkanoyl, at least one of $R_3$ and $R_5$ is other than hydrogen;

R is selected from the group consisting of methyl, ethyl, phenyl, benzyl, allyl, propargyl and p-chlorophenyl;

$R_1$ is selected from the group consisting of methyl, ethyl, allyl and propargyl;

R and $R_1$ when taken together with the nitrogen to which they are attached are selected from the group consisting of pyrrolo, pyrrolino, pyrrolidino, piperidino, N-(lower alkyl)piperazino, hexamethyleneimino, 3,4-dichloropiperidino, thiazolidino, and $\Delta^3$-tetrahydropyridino and piperazino;

each of $R_7$ and $R_8$ is selected from the group consisting of lower alkyl of from 1 to 4 carbon atoms; $R_7$ and $R_8$ when taken together with the nitrogen atom to which they are attached are selected from the group consisting of pyrrolo, pyrrolino, pyrrolidino, piperidino, N-(lower alkyl)piperazino, hexamethyleneimino, thiazolidino, $\Delta^3$-tetrahydropyridino and piperazino;

$X'''$ is selected from the group consisting of oxygen, sulfur, >C = O, =NH, —S→O, —$SO_2$—, and —CHOH—;

$Y'''$ is hydrogen, nitro, cyano, halogen, lower alkyl, or lower alkoxy;

provided that where $R_3$ or $R_5$ is methyl or chloro and $X'''$ is sulfur, —$SO_2$—, or >C = O, then $R_4$ is other than

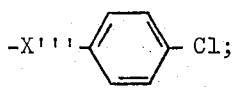

$R_{11}$ is hydrogen, halogen, lower alkylthio, lower alkylsulfinyl, lower alkylsulfonyl, lower alkoxy, trifluoromethyl, or nitro;

$R_{12}$ is lower alkylthio, lower alkylsulfinyl, lower alkylsulfonyl, trifluoromethyl, lower alkanoyl or $SO_2NR_{15}R_{16}$ wherein $R_{13}$ and $R_{14}$ taken together with the nitrogen to which they are attached complete a morpholino, thiomorpholino, or thiazolidino ring;

$R_{15}$ is hydrogen, lower alkyl, propargyl, allyl, hydroxyethyl, acetoxyethyl, $\beta$-methylthioethyl, $\beta$-methoxyethyl, or 3-(2-methoxyethoxy)propyl;

$R_{16}$ is hydrogen, lower alkyl, propargyl, allyl, hydroxyethyl, or acetoxyethyl;

$R_{15}$ and $R_{16}$ when taken together with the nitrogen to which they are attached are pyrrolino, pyrrolidino, morpholino, thiomorpholino, N-(lower alkyl)piperazino, thiazolidino, $\Delta^3$-tetrahydropyridino or piperazino.

Z is hydrogen, lower alkylthio, or halogen;

Y, Y' and Y'' are each hydrogen, halogen, lower alkyl, or trifluoromethyl;

X is oxygen, sulfur, or —$OCH_2$—;

X' is —$OCH_2$—, —$SCH_2$—, —$SOCH_2$—, —$SO_2CH_2$—, or —$CH_2$—, —$OCH_2$—CO—,

X'' is oxygen, sulfur, SO, $SO_2$, >C=O, or —CHOH—.

Any mercaptocarboxylic acid free of interfering substituents can be used in the process of this invention. These include such diverse acids as mercaptoacetic acid, $\alpha$-mercaptopropionic acid, $\beta$-mercaptopropionic acid, 4-mercaptobutyric acid and thiosalicylic acid, as well as the esters thereof, particularly lower alkyl esters, e.g. ethylmercaptoacetate. Particularly preferred are mercapto derivatives of hydrocarbon carboxylic acids, especially those of up to about eleven carbon atoms, and most particularly preferred are α-mercaptoalkanoic acids. Those acids designated as preferred are so named because of their low cost and availability.

The molar ratio of reactants is not critical, and can range from at least 0.1 molar proportion up to a large excess of the mercaptocarboxylic acid. In general, molar proportions of mercaptocarboxylic acid to triazinecarboxylic acid of from about 0.1:1 to about 10:1 are preferred.

The higher proportions of mercaptocarboxylic acid will generally be favored where that acid is a liquid, in which case the excess reagent also serves as a reaction medium. In the case of high-melting mercapto acids, a reaction-inert liquid medium may be additionally employed, i.e. a medium free of adverse effect on the reactants and product under the reaction conditions employed. Such media include, for example, dialkyl ethers of alkylene glycols and alkylene glycol ethers, such as ethylene glycol dimethyl ether, diethylene glycol diethyl ether and the like.

The reaction temperature is not critical. In general, temperatures ranging from ambient temperature up to about 170°C. are favored. Higher temperatures or lower temperatures can, of course, be used but appear to offer no advantages. Temperatures of 130° and higher will generally be used to reduce the reaction time to a period of about 0.5 to about 8 hours. Upon completion of the reaction, the product may be recovered by various methods which will be apparent to those skilled in the art. According to one procedure, the reaction mixture is decolorized, if desired; the pH is adjusted to the range of from about 3 to about 5; and the mixture is cooled to precipitate the product. Alternatively, the reaction mixture is simply poured into water and the precipitated product is collected. The product thus obtained is purified by methods known to those skilled in the art as, for example, by recrystallization from appropriate solvents, by chromatography on a suitable adsorbent, or by a combination of these methods.

The present agents may be orally administered to poultry in a suitable carrier therefor. It is generally convenient and, therefore, preferred to add the agents to the poultry feed so that a therapeutic dosage of the agent is ingested with the daily poultry ration. The agent may be added directly to the feed, as such, or in the form of a premix or concentrate. A premix or concentrate of therapeutic agent in a carrier is commonly employed for the inclusion of the agent in the feed. Suitable carriers are liquid or solid, as desired, such as water, various meals; for example, soybean oil meal, linseed oil meal, corncob meal, and mineral mixes such as are commonly employed in poultry feeds. A particularly effective carrier is the poultry feed itself; that is, a small portion of poultry feed. The carrier facilitates uniform distribution of the active materials in the finished feed with which the premix is blended. This is important because only small portions of the present portent agents are required. It is important that the compound be thoroughly blended into the premix and, subsequently, the feed. In this respect, the agent may be dispersed or dissolved in a suitable oily vehicle such as soybean oil, corn oil, cottonseed oil, and the like, or in a volatile organic solvent and then blended with the carrier. It will be appreciated that the proportions of active material in the concentrate are capable of wide variation since the amount of agent in the finished feed may be adjusted by blending the appropriate proportion of premix with the feed to obtain a desired level of therapeutic agent.

High potency concentrates may be blended by the feed manufacturer with proteinaceous carriers such as soybean oil meal and other meals, as described above, to produce concentrated supplements which are suitable for direct feeding to poultry. In such instances, the poultry is permitted to consume the usual diet. Alternatively, such concentrated supplements may be added directly to the poultry feed to produce a nutritionally-balanced, finished feed containing a therapeutically-effective level of one or more of the compounds of this invention. The mixtures are thoroughly blended by standard procedures, such as in a twin shell blender, to ensure homogeneity. The finished poultry feed should contain roughly between 50 percent and 80 percent of grains, between 0 percent and 10 percent animal protein, between 5 percent and 30 percent vegetable protein, between 2 percent and 4 percent minerals, together with supplemental vitaminaceous sources.

It will, of course, be obvious to those skilled in the art that the use levels of the compounds described herein will vary under different circumstances. Continuous low-level medication, during the growing period, that is, during the first 8 to 12 weeks for chickens, is an effective prophylactic measure. In the treatment of established infections, higher levels may be necessary to overcome the infection.

The present compounds may be employed at substantially low levels in feeds for the prevention or treatment of coccidiosis. Generally, the feed compositions of the present invention comprise a minor amount of the 2-phenyl-as-triazine compounds of this invention and a major amount of a nutritionallybalanced feed, as described above. Feed compositions containing as little as 0.0015 percent of the present agent are found to effectively combat coccidiosis. Large amounts of the agent, up to 0.1 percent and larger, may also be employed. Of course, concentrations of less than 0.0015 percent provide some control of the infections. The concentration range favored in feed compositions is from about 0.0015 percent to about 0.05 percent. The preferred range is from about 0.0015 percent to about 0.025 percent of the ration. When administered by incorporation into the drinking water, preferably as an alkali metal or alkaline earth metal salt, the herein described compounds are used at levels one-half the dosage given above for feeds.

The present feed compositions and supplements may also contain other effective therapeutic agents such as antibiotics to promote growth and general health of the poultry as well as sulfa compounds which may increase the effectivenenss of the present coccidiostats.

The examples to follow are illustrative and in no way limit the scope of the appended claims.

EXAMPLES I–XIV

The following reagents and procedures were used in Examples I–XIV as shown in the table below. The triazine carboxylic acid (I) was added to the mercaptocarboxylic acid which was preheated to 100°C. The resulting solution was heated as shown below, and the completion of the reaction was monitored by thin layer chromatography. The hot solution was poured onto water and the precipitated solid was filtered off. The product (II) was crystallized from ethanol. In one example (Example V) the reaction was carried out in the presence of the inert solvent diglyme.

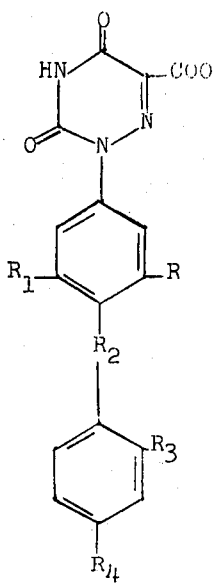

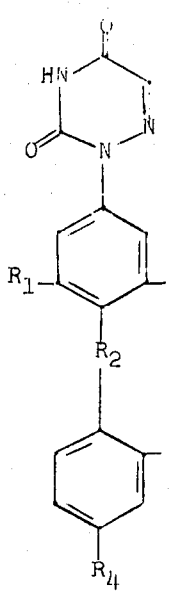

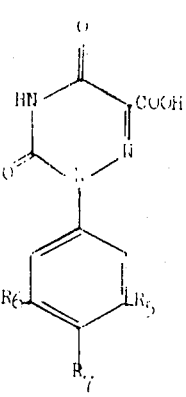

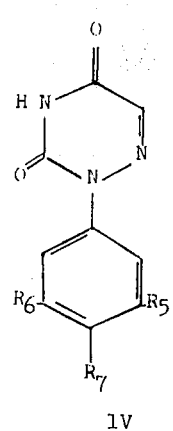

I    II    III    IV

EXAMPLES XV–XVII

Following the procedures of Examples I–XIV but employing triazinecarboxylic acids of formula III below, the products (IV) are obtained.

| Example Number | R | $R_1$ | $R_2$ | $R_3$ | $R_4$ | Quantity of Triazine I Used (g) | Mercapto Carboxylic Acid |
|---|---|---|---|---|---|---|---|
| I | $CH_3$ | $CH_3$ | S | H | Cl | 159 | Mercaptoacetic acid |
| II | Cl | H | C=O | H | Cl | 3.28 | Mercaptoacetic acid |
| III | Cl | H | O | H | Cl | 2.26 | Mercaptoacetic acid |
| IV | Cl | H | O | H | Br | 11.0 | Mercaptoacetic acid |
| V | $CH_3$ | H | O | H | Br | 1.0* | Thiosalicylic Acid |
| VI | Cl | H | O | $CH_2CH_3$ | H | 1.93 | α-Mercaptopropionic Acid |
| VII | Cl | H | O | $CH_2CH_3$ | H | 1.93 | β-Mercaptopropionic Acid |
| VIII | Cl | H | O | $CH_2CH_3$ | H | .965 | 4-Mercaptobutyric acid |
| IX | $CH_3$ | Cl | S | H | Cl | 8.2 | Mercaptoacetic acid |
| X | $CH_3$ | Cl | C=O | H | Cl | 2.14 | Mercaptoacetic acid |
| XI | Cl | H | O | H | I | 10.0 | Mercaptoacetic acid |
| XII | $CF_3$ | H | O | $CH_3$ | Cl | 5.0 | Mercaptoacetic acid |
| XIII | Cl | H | O | Cl | Cl | 0.41 | Ethyl Mercapto acetate |
| XIV | $CH_3$ | $CH_3$ | S | H | Cl | 4.04 | Mercaptoacetic acid |

*The triazine was dissolved in 3.5 ml. diglyme before addition to mercapto acid.

| Example Number | Quantity of Acid Used(g) | Molar Ratio (I:acid) | Product II (g) | % Yield | Melting Point(°C) | Reaction Temperature (°C) | Reaction Time (hours) |
|---|---|---|---|---|---|---|---|
| I | 211 | 1:5.87 | 89.6 | 64.1 | 135–136 | 155 | 2 |
| II | 6.62 | 1:8.99 | 2.52 | 87 | 199–202 | 165 | 1.5 |
| III | 5.3 | 1:10 | 1.21 | 60 | 189–191 | 130 | 0.5 |
| IV | 14.59 | 1:6.32 | 9.42 | 85 | 203–204 | 150 | 1.5 |
| V | .368 | 1:1 | .492 | 55 | 179–181 | 160 | 4 |
| VI | 2.35 | 1:4.41 | .996 | 57.6 | 105–107 | 150 | 1 |
| VII | 2.35 | 1:4.41 | 1.0 | 58.4 | 106–107 | 150 | 0.83 |
| VIII | 1.17 | 1:4.45 | .594 | 69.5 | 105–107 | 150 | 1.25 |
| IX | 27.0 | 1:15.45 | 7.2 | 98.0 | 92–94 | 170 | 1.6 |
| X | 2.14 | 1:6.28 | 1.67 | 88 | 130–135 | 170 | 1.3 |
| XI | 13.5 | 1:7.1 | 7.0 | 77 | 218–220 | 170 | 4 |
| XII | 6.75 | 1:6.5 | 4.7 | 90 | 127–129 | 160 | 3 |
| XIII | 0.373 | 1:3.25 | 0.31 | 84.2 | 137–139 | 160 | 1 |
| XIV | 0.92 | 1:0.1 | 1.8 | 50 | 135–136 | 155 | 4 |

| Example No. | $R_5$ | $R_6$ | $R_7$ | Quantity of III used (g) | Mercapto Carboxylic Acid |
|---|---|---|---|---|---|
| XV | H | H | $NO_2$ | 63.6 | Mercaptoacetic Acid |
| XVI | $CO_2H$ | H | H | 60.0 | Mercaptoacetic Acid |
| XVII | $CH_3$ | Cl | H | 57.0 | Mercaptoacetic Acid |

| Example No. | Quantity of Acid Used(g) | Molar Ratio (III:Acid) | Product IV(g) | % Yield | Melting Point(°C) | Reaction Temperature (°C) | Reaction Time (hours) |
|---|---|---|---|---|---|---|---|
| XV | 81.0 | 1:3.84 | 42 | 78.5 | 228 | 100 | 3 |
| XVI | 607 | 1:30.6 | 45.3 | 90 | 325–327 | 170 | 1.6 |
| XVII | 67.5 | 1:4.58 | 23.0 | 61 | 180–181 | 160 | 2 |

| Example Number | QHy of Triazine Acid Used (g) | QHy of Mercaptoacetic Acid Used (ml) | Product Triazine (g) | Melting Point°C. | X | Y | $R_2$ | $R_3$ | $R_4$ | $R_5$ |
|---|---|---|---|---|---|---|---|---|---|---|
| XVIII | 9.0 | 9.0 | 7.4 | 185–187 | Cl | H | H | H | $SCH_3$ | H |
| XIX | 4.6 | 4.0 | 2.3 | 133–136 | $CH_3$ | $CH_3$ | H | $CH_3$ | $SCH_3$ | H |
| XX | 8.5 | 8.0 | 5.0 | 131–133 | $CH_3$ | $CH_3$ | H | H | $SCH_3$ | H |
| XXI | 30.0 | 30.0 | 19.0 | 176–177 | $CH_3$ | Cl | H | H | H | H |
| XXII | 36.5 | 36.0 | 19.1 | 183–184 | $CH_3$ | $CH_3$ | H | H | H | H |
| XXIII | 14.3 | 15.0 | 11.5 | 167–172 | $CH_3$ | Cl | $CH_3$ | H | H | H |
| XXIV | 8.0 | 8.0 | 6.5 | 148–149.5 | $CH_3$ | Cl | H | $CH_3$ | $SCH_3$ | H |
| XXV | 40.0 | 30.0 | 26.3 | 181–183 | $CH_3$ | Cl | Cl | H | H | H |
| XXVI | 22.5 | 23.0 | 20.0 | 133–135 | Cl | H | $CH_3$ | $CH_3$ | H | H |
| XXVII | 5.3 | 6.0 | 4.0 | 151–154 | $CH_3$ | $CH_3$ | H | H | $COCH_3$ | H |
| XXVIII | 205 | 200 | 176 | 202–203 | $CH_3$ | Cl | H | H | $COCH_3$ | H |
| XXIX | 3.1 | 5.0 | 1.6 | 137–140 | $CH_3$ | Cl | H | $CH_3$ | $COCH_3$ | H |
| XXX | 20.0 | 15.0 | 14.0 | 171–172 | $CH_3$ | Cl | $C_2H_5$ | H | H | H |
| XXXI | 6.0 | 6.0 | 5.0 | 228–231 | Cl | H | 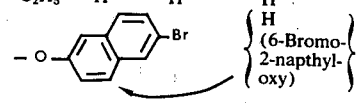 (6-Bromo-2-napthyl-oxy) | | | H |
| XXXII | 6.0 | 6.0 | 5.4 | 188–190 | Cl | H | H | $CH_3$ | $SCH_3$ | H |

EXAMPLES XVIII–XXXII

Following the procedures of Examples I–XVII, the following triazines were obtained from the corresponding triazine carboxylic acids:

EXAMPLES XXXIII–LXXVII

Following the foregoing procedures, the compounds below are prepared.

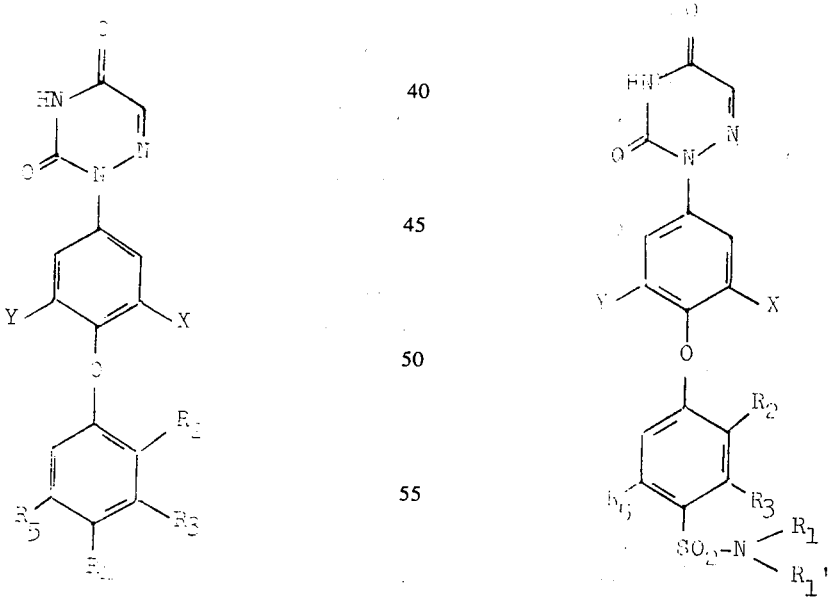

| Example Number | X | Y | $R_2$ | $R_3$ | $R_5$ | $R_1$ | $R_1'$ | M.P. (°C.) |
|---|---|---|---|---|---|---|---|---|
| XXXIII | $CH_3$ | Cl | $CH_3$ | H | H | $CH_3$ | $CH_3$ | 271–275 |
| XXXIV | $CH_3$ | Cl | $CH_3$ | H | H | $R_1R_1'=$ | Morpholino | 252–254 |
| XXXV | $CH_3$ | Cl | Cl | H | H | $CH_3$ | $CH_3$ | 282–284 |
| XXXVI | $CH_3$ | Cl | Cl | H | H | $C_2H_5$ | $C_2H_5$ | 230–235 |
| XXXVII | $CH_3$ | Cl | Cl | H | H | $R_1R_1'=$ | Morpholino | 246–249 |
| XXXVIII | $CH_3$ | Cl | Cl | H | H | $CH_3$ | $C_2H_5$ | 250–253 |
| XXXIX | $CH_3$ | Cl | Cl | H | H | H | $-CH_2CH_2OCH_3$ | 179–185 |
| XL | $CH_3$ | Cl | Cl | H | H | H | $-CH_2CH_2-CH_3$ | 139–142 |

— Continued

| Example Number | X | Y | $R_2$ | $R_3$ | $R_5$ | $R_1$ | $R_1'$ | M.P. (°C.) |
|---|---|---|---|---|---|---|---|---|
| XLI | $CH_3$ | $CH_3$ | $CH_3$ | $CH_3$ | $CH_3$ | $C_2H_5$ | $C_2H_5$ | 206–208 |
| XLII | $CH_3$ | $CH_3$ | $CH_3$ | $CH_3$ | $CH_3$ | $CH_3$ | $CH_3$ | 228–229 |
| XLIII | $CH_3$ | $CH_3$ | $CH_3$ | $CH_3$ | $CH_3$ | $CH_3$ | $C_2H_5$ | 206–207 |
| XLIV | $CH_3$ | Cl | $CH_3$ | $CH_3$ | H | $C_2H_5$ | $C_2H_5$ | 264–265 |
| XLV | $CH_3$ | $CH_3$ | $CH_3$ | $CH_3$ | $CH_3$ | H | $-(CH_2)_2OCH_3$ | 210–214 |
| XLVI | $CH_3$ | $CH_3$ | $CH_3$ | $CH_3$ | $CH_3$ | H | $-CH_2CH_2CH_3$ | 220–224 |
| XLVII | $CH_3$ | $CH_3$ | $CH_3$ | $CH_3$ | $CH_3$ | $R_1R_1' =$ | Pyrrolino | 203–207 |
| XLVIII | $CH_3$ | $CH_3$ | $CH_3$ | $CH_3$ | $CH_3$ | $-CH_2CH_2CH_3$ | $-CH_2CH_2CH_3$ | 199–202 |
| XLIX | $CH_3$ | $CH_3$ | $CH_3$ | $CH_3$ | $CH_3$ | H | ◁ | 240–243 |
| L | $CH_3$ | Cl | Cl | H | H | H | ◁ | 208–211 |
| LI | $CH_3$ | Cl | Cl | H | H | $R_1R_1' =$ | Pyrrolino | 285–288 |
| LII | $CH_3$ | $CH_3$ | $CH_3$ | $CH_3$ | $CH_3$ | H | $-CH_2CH_2SCH_3$ | 150–151 |
| LIII | $CH_3$ | Cl | Cl | H | H | H | $-CH_2CH_2SCH_3$ | 129–130 |
| LIV | $CH_3$ | Cl | Cl | H | H | $CH_3$ | $-CH_2-CH=CH_2$ | 181–183 |
| LV | $CH_3$ | Cl | $CH_3$ | $CH_3$ | $CH_3$ | H | $-CH_2-CH_2OCH_3$ | 196–200 |
| LVI | $CH_3$ | Cl | $CH_3$ | $CH_3$ | $CH_3$ | H | $-CH_2CH_2OH$ | 188–193 |
| LVII | $CH_3$ | Cl | $CH_3$ | $CH_3$ | $CH_3$ | $C_2H_5$ | $C_2H_5$ | 202–204 |
| LVIII | $CH_3$ | Cl | $CH_3$ | $CH_3$ | $CH_3$ | H | $-CH_2CH_2SCH_3$ | 172–174 |
| LIX | $CH_3$ | Cl | $CH_3$ | $CH_3$ | $CH_3$ | $CH_3$ | $C_2H_5$ | 152–153 |
| LX | $CH_3$ | Cl | $CH_3$ | $CH_3$ | $CH_3$ | $CH_3$ | $-CH_2CH=CH_2$ | 136–138 |
| LXI | $CH_3$ | Cl | $CH_3$ | $CH_3$ | $CH_3$ | $R_1R_1' =$ | Pyrrolino | 144–145 |
| LXII | $CH_3$ | Cl | $CH_3$ | $CH_3$ | $CH_3$ | H | $-CH_2CH_2CH_3$ | 163–164 |
| LXIII | $CH_3$ | Cl | $CH_3$ | $CH_3$ | $CH_3$ | H | $C_2H_5$ | 160–164 |
| LXIV | $CH_3$ | Cl | $CH_3$ | $CH_3$ | $CH_3$ | $CH_3$ | $CH_3$ | 150–151 |
| LXV | $CH_3$ | Cl | $CH_3$ | $CH_3$ | $CH_3$ | H | H | 252–255 |
| LXVI | $CH_3$ | Cl | $CH_3$ | $CH_3$ | $CH_3$ | $CH_3$ | H | 151–154 |
| LXVII | $CH_3$ | Cl | $CH_3$ | $CH_3$ | $CH_3$ | H | ◁ | 240–243 |
| LXVIII | $CH_3$ | Cl | $CH_3$ | $CH_3$ | $CH_3$ | H | $-CH_2CH_2OCOCH_3$ | 173–175 |
| LXIX | $CH_3$ | Cl | Cl | H | H | H | $-CH_2-CH_2OH$ | 206 |
| LXX | $CH_3$ | Cl | Cl | H | H | H | $-CH(CH_3)_2$ | 215–217 |
| LXXI | $CH_3$ | Cl | Cl | H | H | H | $-CH_2CH_2SO_2CH_3$ | 191–194 |
| LXXII | $CH_3$ | Cl | Cl | H | H | H | $CH_2CH_2OCOCH_3$ | 120 |
| LXXIII | $CH_3$ | Cl | $CH_3$ | $CH_3$ | $CH_3$ | H | $-CH(CH_3)_2$ | 150–152 |
| LXXIV | $CH_3$ | $CH_3$ | $CH_3$ | $CH_3$ | $CH_3$ | $CH_3$ | $-CH_2-CH=CH_2$ | 153–155 |
| LXXV | $CH_3$ | $CH_3$ | $CH_3$ | $CH_3$ | $CH_3$ | H | $-CH_2-CH_2OH$ | 228–232 |
| LXXVI | $CH_3$ | $CH_3$ | $CH_3$ | $CH_3$ | $CH_3$ | H | $-CH_2CH_2SO_2CH_3$ | 213–217 |
| LXXVII | $CH_3$ | $CH_3$ | $CH_3$ | $CH_3$ | $CH_3$ | H | $-CH_2-CH_2OCOCH_3$ | 135–137 |

| Example Number | $R_2$ | $R_3$ | $R_4$ | $R_5$ | $R_6$ | M.P. °C. |
|---|---|---|---|---|---|---|
| LXXVIII | H | $CH_3$ | $-O-(4SO_2CH_3-C_6H_4)$ | H | H | 185–186.5 |
| LXXIX | H | $CH_3$ | $-O-(3CH_3-4SO_2CH_3-C_6H_3)$ | H | H | 189–190 |
| LXXX | H | Cl | $-O-(3CH_3-4SO_2CH_3-C_6H_3)$ | H | H | 224–225 |
| LXXXI | H | Cl | $-O-(3CH_3-4SO_2CH_3-C_6H_3)$ | $CH_3$ | H | 282–283 |
| LXXXII | H | $CH_3$ | $-O-(3CH_3-4SO_2CH_3-C_6H_3)$ | $CH_3$ | H | 293–295 |

EXAMPLES LXXVIII–LXXXII

In like manner, the following compounds are prepared from appropriate reactants:

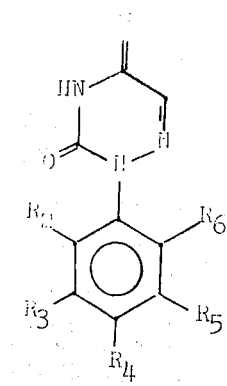

What is claimed is:

1. A process for the preparation of a 2-(aryl)-as-triazine-3,5(2H,4H)dione of the formula

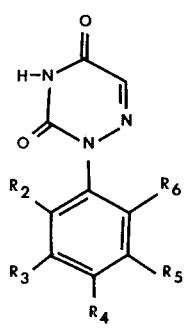

which comprises contacting compound A of the formula:

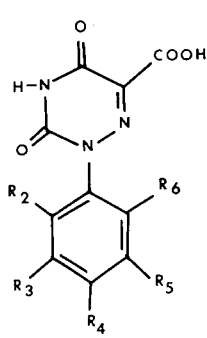

wherein
each of $R_2$ and $R_6$ is hydrogen, fluoro, chloro, cyano or methyl, with the proviso that at least one of $R_2$ and $R_6$ is hydrogen or fluoro;
each of $R_3$ and $R_5$ is selected from a first sub-group consisting of hydrogen, cyano, trifluoromethyl, halogen and lower alkyl; a second sub-group consisting of lower alkoxy and lower alkylthio; or a third sub-group consisting of nitro and thiocyanato;
$R_4$ is $-NR_7R_8$, lower alkanoyl, lower alkyl sulfonyl, $SO_2NRR_1$;

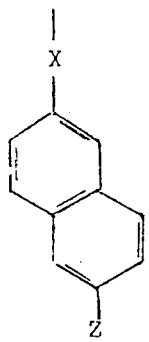

I

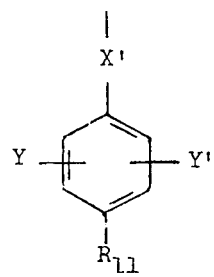

II

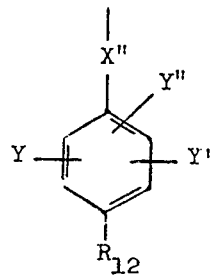

III

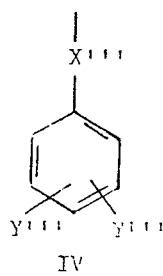

IV or $-CH_2-NR_{13}R_{14}$;

or $-CH_2-NR_{13}R_{14}$;
with the proviso that when $R_4$ is $SO_2NRR_1$ or lower alkanoyl, at least one of $R_3$ and $R_5$ is other than hydrogen;
R is selected from the group consisting of methyl, ethyl, phenyl, benzyl, allyl, propargyl and p-chlorophenyl;
$R_1$ is selected from the group consisting of methyl, ethyl, allyl and propargyl;
R and $R_1$ when taken together with the nitrogen to which they are attached are selected from the group consisting of pyrrolo, pyrrolino, pyrrolidino, piperidino, N-(lower alkyl)piperazino, hexamethyleneimino, 3,4-dichloropiperidino, thiazolidino, and $\Delta^3$-tetrahydropyridino and piperazino;
each of $R_7$ and $R_8$ is selected from the group consisting of lower alkyl of from 1 to 4 carbon atoms; $R_7$ and $R_8$ when taken together with the nitrogen atom to which they are attached are selected from the group consisting of pyrrolo, pyrrolino, pyrrolidino, piperidino, N-(lower alkyl)piperazino, hexamethyleneimino, thiazolidino, $\Delta^3$-tetrahydropyridino and piperazino;
$X'''$ is selected from the group consisting of oxygen, sulfur, $>C=O$, $=NH$, $-S\rightarrow O$, $-SO_2-$, and $-CHOH-$;
$Y'''$ is hydrogen, nitro, cyano, halogen, lower alkyl, or lower alkoxy;
provided that where $R_3$ or $R_5$ is methyl or chloro and $X'''$ is sulfur, $-SO_2-$, or $>C=O$, then $R_4$ is other than

$R_{11}$ is hydrogen, halogen, lower alkylthio, lower alkylsulfinyl, lower alkylsulfonyl, lower alkoxy, trifluoromethyl, or nitro;

$R_{12}$ is lower alkylthio, lower alkylsulfinyl, lower alkysulfonyl, trifluoromethyl, lower alkanoyl or $SO_2NR_{15}R_{16}$ wherein
$R_{13}$ and $R_{14}$ taken together with the nitrogen to which they are attached complete a morpholino, thiomorpholino, or thiazolidino ring;
$R_{15}$ is hydrogen, lower alkyl, propargyl, allyl, hydroxyethyl, acetoxyethyl, $\beta$-methylthioethyl, $\beta$-methoxyethyl, or 3-(2-methoxyethoxy)propyl;
$R_{16}$ is hydrogen, lower alkyl, propargyl, allyl, hydroxyethyl, or acetoxyethyl;

$R_{15}$ and $R_{16}$ when taken together with the nitrogen to which they are attached are pyrrolino, pyrrolidino, morpholino, thiomorpholino, N-(lower alkyl)-piperazino, thiazolidino, $\Delta^3$-tetrahydropyridino or piperazino, Z is hydrogen, lower alkylthio, or halogen;

Y, Y' and Y'' are each hydrogen, halogen, lower alkyl, or trifluoromethyl;

X is oxygen, sulfur, or $-OCH_2-$;

X' is $-OCH_2-$, $-SCH_2-$, $-SOCH_2-$, $-SO_2CH_2-$, or $-CH_2-$, $-OCH_2-CO-$,

X'' is oxygen, sulfur, SO, $SO_2$, $>C=O$, or $-CHOH-$;

with at least about 0.1 molar proportion of compound B which is mercapto-substituted-alkanoic acid of up to about eleven carbon atoms; thiosalicylic acid; or the lower alkyl esters thereof, until the reaction is substantially complete.

2. The process of claim 1 wherein the ratio of said compound B to said compound A is from about 0.1:1.0 to 10:1.

3. The process of claim 1 wherein said compound B is mercaptoacetic acid.

4. The process of claim 1 wherein said contacting is conducted at from 130° to 170°C.

5. The process of claim 1 wherein said compound A is so selected that $R_4$ is of the formula:

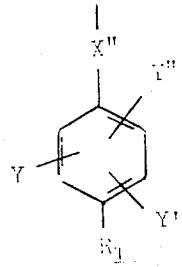

6. The process of claim 5 wherein X'' is oxygen.

7. The process of claim 6 wherein $R_{12}$ is $-COCH_3$; $R_3$ is chloro; $R_5$ is methyl; $R_2$, $R_6$, Y, Y', and Y'' are each hydrogen.

8. The process of claim 6 wherein $R_{12}$ is

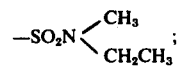

$R_3$ is chloro; $R_5$ is methyl, Y is o-chloro; and $R_2$, $R_6$, Y' and Y'' are each hydrogen.

* * * * *